United States Patent [19]

Martin et al.

[11] Patent Number: 5,721,956
[45] Date of Patent: Feb. 24, 1998

[54] METHOD AND APPARATUS FOR SELECTIVE BUFFERING OF PAGES TO PROVIDE CONTINUOUS MEDIA DATA TO MULTIPLE USERS

[75] Inventors: Clifford Eric Martin, Martinsville; Banu Ozden, Summit; Rajeev Rastogi, New Providence; Abraham Silberschatz, Summit, all of N.J.

[73] Assignee: Lucent Technologies Inc., Murray Hill, N.J.

[21] Appl. No.: 440,737

[22] Filed: May 15, 1995

[51] Int. Cl.⁶ .................................................. G06F 13/14
[52] U.S. Cl. ................... 395/872; 395/876; 395/878; 395/881; 395/460; 395/461
[58] Field of Search ....................... 395/460, 461, 395/440, 416, 412, 872, 876, 878, 881

[56] References Cited

U.S. PATENT DOCUMENTS 5,233,702  8/1993  Emma et al. ............................ 395/445
5,282,274  1/1994  Liu ............................................ 395/416
5,394,537  2/1995  Courts et al. ........................... 395/412

Primary Examiner—Tod R. Swann
Assistant Examiner—J. Peikari

[57] ABSTRACT

Buffer space and disk bandwidth resources in a continuous media server are continuously re-allocated in order to optimize the number of continuous media requests which may be concurrently serviced at guaranteed transfer rates using on demand paging. Disk scheduling is provided to ensure that whenever an admitted request references a page of data, the page is available in a buffer for transfer to a client. Data for continuous media data files are stored on disk or held in the buffer to eliminate disk bandwidth limitations associated with concurrently servicing any number or combination of requests, provided buffer space is sufficient. Multiple requests for continuous media data files are selectively included in groups for servicing in order to provide that buffer and disk bandwidth requirements are maintained at a minimum and within available resource capabilities.

49 Claims, 7 Drawing Sheets

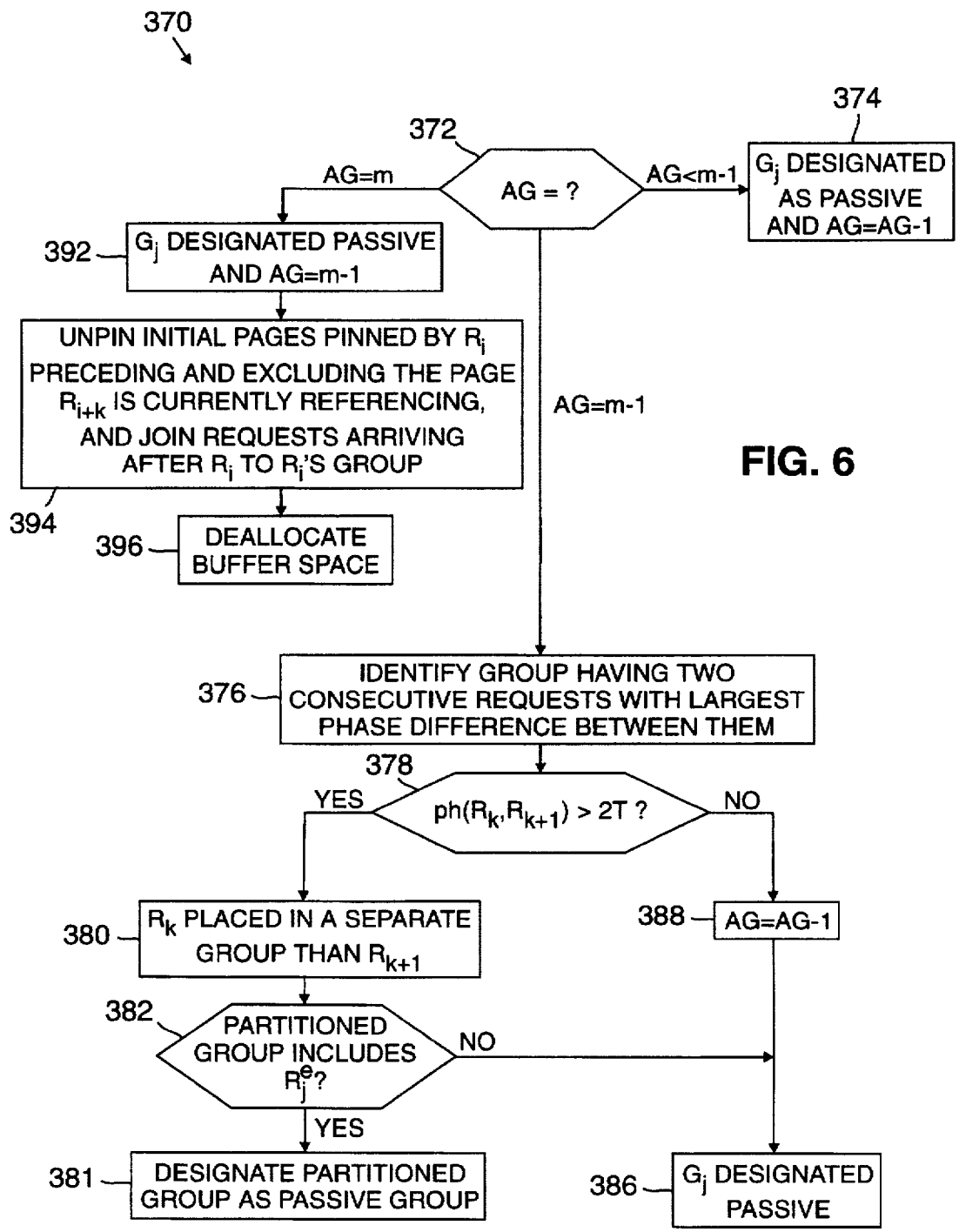

METHOD AND APPARATUS FOR SELECTIVE BUFFERING OF PAGES TO PROVIDE CONTINUOUS MEDIA DATA TO MULTIPLE USERS

FIELD OF THE INVENTION

This invention relates generally to continuous media services. More particularly, the present invention concerns techniques for concurrently servicing multiple continuous media requests.

BACKGROUND OF THE INVENTION

Continuous media services have become exceptionally popular with telecommunication, computer and cable companies as optical fiber networks having bandwidths approaching several gigabits per second have developed. A client who subscribes to a continuous media service, such as movie on demand (MOD), can request to start receiving a particular continuous media data file, such as, for example, a movie, at any desired time.

A device known as a continuous media server includes the components and performs the operations for servicing continuous media requests. The server typically includes a permanent library containing multiple continuous media data files, such as musical songs or movies, a cache for storing continuous media data files which a client may currently request and a buffer for temporarily storing portions of the continuous media data files which must be made available for servicing the requests. A stream of continuous media data must be continuously transmitted to a client from the buffer at a transfer rate which ensures that presentation of the requested data file, such as the display of a movie, is uninterrupted.

The server bandwidth of a server determines the maximum number of requests which can be serviced concurrently. The availability and allocation of disk bandwidth and buffer space in the server, however, may limit the amount of data that can be transferred from the cache to the buffer at any instance, such that the total number of requests that can be concurrently serviced may be less than that permitted by the server bandwidth. For adequate servicing, a new request for a data file, which arrives at the server subsequent to other requests for the same data file which are still being serviced, can be admitted for servicing only if sufficient disk bandwidth and buffer space are available at the arrival time of the new request to guarantee that data for that request and all other previous requests being serviced are made available for transfer at the appropriate transfer rates.

The cost of including a buffer which can store large amounts of data in a server in order to increase the number of requests which can be concurrently serviced at the required transfer rates is prohibitively expensive due to the high cost of flat architecture random access memory (RAM) devices currently used in buffers. For example, storing video data for multiple movies in a RAM-based buffer is costly and impractical, as approximately 1.125 GB of memory space is required for storing a 100 minute movie which has been compressed using MPEG-1 technology and must be transmitted at 1.5 MB/s.

One proposed solution to the buffer space and disk bandwidth limitations for concurrently servicing multiple continuous media requests requires that each client purchase a separate buffer at the server. This solution is particularly inefficient and would increase continuous media service costs for each client and the public-at-large.

It is well known that demand paging techniques, described in detail in Silberschatz, A. and Galin, P., *Operating System Concepts*, (1994) pp. 303–309, incorporated by reference herein, provide that a portion or page of data from a media data file is loaded as needed, or on demand, from disk into a buffer memory for purposes of servicing a request for that data file. Typical demand paging processes are applied in non-continuous media service applications, such as computer data retrieval, to provide for minimizing the amount of buffer space required for concurrently servicing a large number of requests. Current demand paging techniques, however, are not readily applicable to continuous media service applications, because they cannot provide a guarantee that a particular transfer rate will always be maintained for servicing continuous media requests.

A need, therefore, exists for a technique which maximizes the utilization of the available disk bandwidth and buffer space in a continuous media server and provides that multiple requests for continuous media data files may be concurrently serviced at guaranteed transfer rates.

SUMMARY OF THE INVENTION

In accordance with the present invention, methods and apparatus are described for concurrently providing continuous media data to multiple clients at guaranteed transfer rates using on demand paging. Buffer space and disk bandwidth resources in a continuous media server, which includes a buffer memory connected to a disk that contains continuous media data files, are continuously re-allocated to optimize the number of continuous media requests which may be concurrently serviced.

In one embodiment, multiple requests for a movie are concurrently serviced at the required transfer rate by implementation of a demand paging technique called pinned demand paging (PDP). In PDP, disk bandwidth resources are allocated in a server to ensure that whenever an admitted request references a page, the page is available in a buffer of the server for transfer to a client. The page currently being referenced by a request is pinned in the buffer simultaneously with the next page which the request will reference. For PDP, the size of a page of data of a continuous media data file or the duration that a page of data is stored in the buffer is selected in order to eliminate any disk bandwidth limitation for servicing multiple requests for the data file.

In another aspect of the invention, buffer and disk bandwidth resources in a server are allocated for servicing multiple requests by implementation of a demand paging technique called shortest distance pinning (SDP). In SDP, the PDP techniques described above are extended such that the number of requests in groups is dynamically increased or decreased to maintain the buffer requirements at a minimum while also maintaining disk bandwidth requirements within the resource capability of a server. In particular, a single bandwidth unit is reserved to ensure servicing of any number of newly received requests.

In further aspects of the present invention, SDP and PDP may be implemented for servers which include disks upon which continuous media data files are stored using either the fine-grained or coarse-grained striping data storage models.

Further features and advantages of the present invention will be readily apparent from the detailed description that follows.

DESCRIPTION OF THE DRAWINGS

FIG. 6 is a flow diagram of a method for converting an active group to passive in accordance with SDP.

DETAILED DESCRIPTION

The present invention provides methods and apparatus for optimally utilizing buffer space and disk bandwidth in a continuous media server for concurrently servicing multiple continuous media units requests at the corresponding transfer rates using on demand paging. See generally Silberschatz and Galin, cited above, for a detailed description of the general principles of on demand paging.

Figure 1:
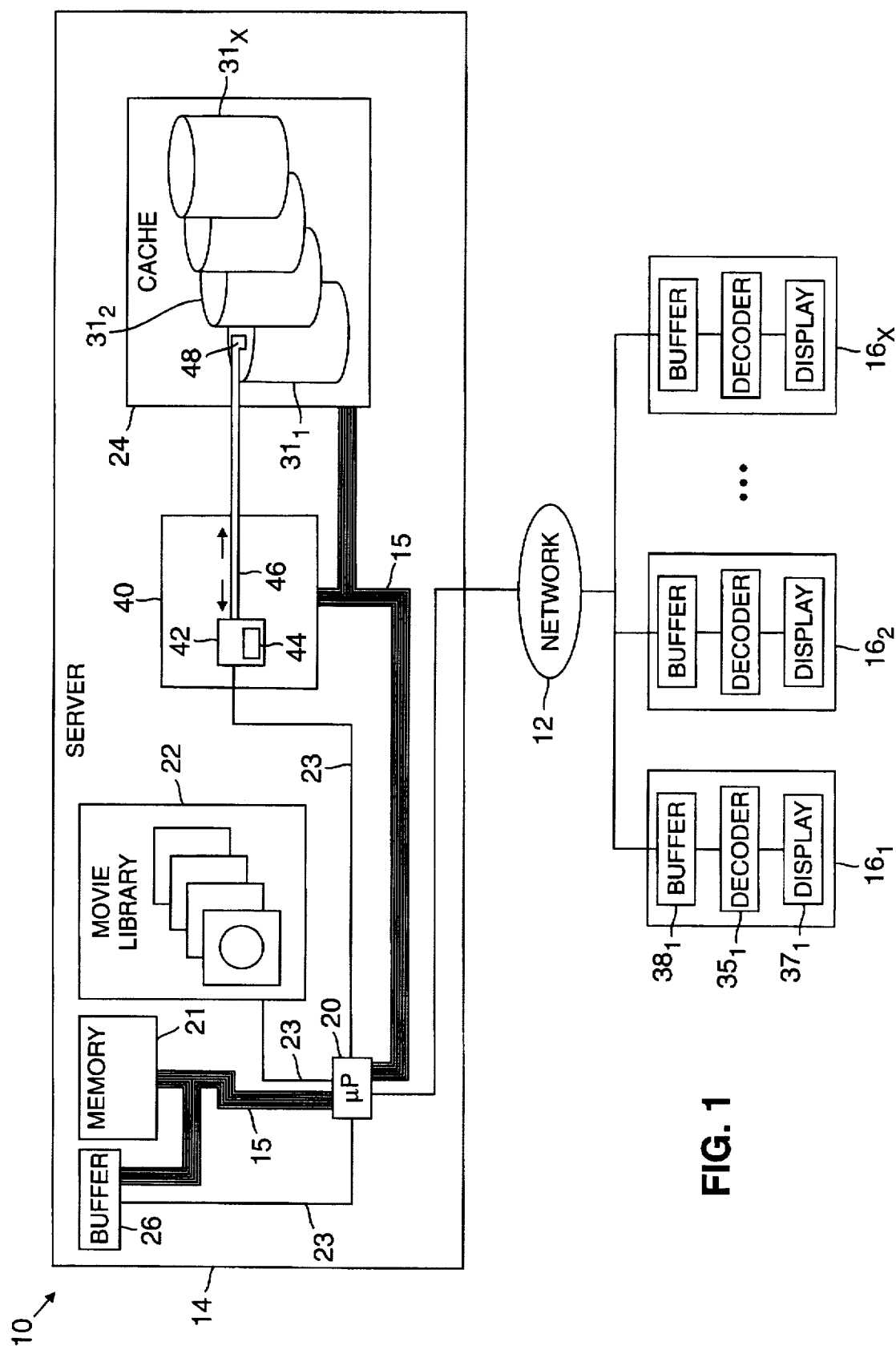
FIG. 1 illustrates an exemplary embodiment of a continuous media server in a communications system.

FIG. 1 illustrates an exemplary communication system 10 for providing continuous media service. By way of example, movie on demand (MOD) services are provided in the system 10. It is to be understood, however, that the inventive techniques explained below may be utilized for servicing other continuous media unit requests, such as audio, and that the features of this invention may be implemented in a system which services continuous and non-continuous media requests, such as, for example, those requests associated with on-line banking or shopping transactions.

The system 10 suitably comprises a high bandwidth network 12, such as an optical fiber network, connected to a movie on demand (MOD) continuous media server 14 and a plurality of viewer units $16_{1,2 \ldots x}$. The server 14 may suitably comprise a microcontroller or processor 20 connected to a movie data library 22, a cache 24, a disk reader system 40, a random access memory (RAM) buffer 26 and a memory 21 by a standard bus line 15. The cache 24 suitably includes standard storage disks $31_{1,2 \ldots x}$. The library 22 and the cache 24 via the disk reader system 40, are connected to the buffer 26 through the processor 20 over transmitting lines 23 in a well known manner.

The viewer units $16_{1,2 \ldots x}$ comprise a plurality of decoders $35_{1,2 \ldots x}$ connected to a plurality of standard displays $37_{1,2 \ldots x}$ and a plurality of local buffers $38_{1,2 \ldots x}$, respectively. Each of the local buffers $38_{1,2 \ldots x}$ is also connected to the network 12.

The disk reading system 40 provides for retrieval of data from the disks $31_{1,2 \ldots x}$ in accordance with the present invention. A disk $31_1$, for example, is inserted into a disk drive 42 of the system 40. The disk drive 42 comprises a moveable disk arm 44 and a shaft 46 which rotates the disk. An output of binary data which has been read or retrieved from the disk $31_1$ is provided to the buffer 26 over the transmission lines 23 and via the processor 20. To retrieve the data required for servicing a request, the disk $31_1$ is rotated and a disk head 308 which is attached to the shaft 306 is positioned over the particular track containing the data to be retrieved. The movable arm 304 directs the head 308 to the appropriate track.

The server 14 may suitably be owned by a communication service provider, such as, for example, a long distance exchange carrier or a cable broadcaster, which provides MOD service via the network 12 to a client having a viewer unit. The library 22 suitably contain any of the various types of continuous media data files or combinations of the various types of continuous media data files. In the exemplary embodiment however, movies are stored therein. It is to be understood that the library 22 may be located external to the MOD server 14.

The processor 20 stores in the memory 21 data concerning the time a request arrives at the server 14, the processing status of requests which have been admitted for servicing and the utilization of space in the buffer 26 and disk bandwidth on the lines 23. As more fully discussed below, the processor 20 determines whether to admit a new request for servicing using demand paging techniques based on the amount of available space in the buffer 26 and the availability of disk bandwidth units on the lines 23 which connect the cache 24 to the buffer 26.

The cache 24 contains a set of movies which are stored on the disks $31_{1,2 \ldots x}$. The movies stored in the cache 24 are updated from the library 22 according to well known techniques which are not a part of this invention. By way of example, a single disk in the cache 24 may completely contain a single movie or only portions of that movie. A movie is suitably stored on a disk in the cache 24 as a sequence of pages of size d. It is to be understood, however, that a single movie may be stored on multiple disks which contain only that movie, such that a page of the movie may be retrieved in parallel from multiple disks for transmission over the lines 23 to the buffer 26.

For purposes of clarity, the present invention is initially described for the servicing of requests for a single movie which is stored on a single disk. The present inventive techniques are then discussed with reference to requests for continuous media data files which are stored over multiple disks.

The buffer 26 typically consists of a fixed number of storage frames, each of which is of the same fixed size. For purposes of clarity and simplicity, the page size d of a movie stored on a disk is the same as the frame size. The processor 20 transmits suitable signals over the bus line 15 to the disk reader system 40 for directing the disk head 308 to retrieve a page from a disk in the cache 24 for transfer via the lines 23 and loading into one of the empty frames in the buffer 26. The steps of retrieving, transferring and loading a page of data from disk into the buffer 26 is hereinafter generally referred to as paging.

The processor 20 further provides suitable control signals to the buffer 26 over the bus line 15 for making pages of movie data available for transfer from the buffer 26, over the network 12 and to the local buffer of the viewer unit which made the request. The decoder in the viewer unit decodes or consumes the data transmitted to the local buffer in a time period, T, at the transfer or display rate, r, of the movie, such that the page size d is equal to T·r. The decoder typically provides video frames to the display unit at a standard display monitor playback rate, such as at the 30 frames/sec rate used in MPEG-1, as it decodes pages of data which were received at the local buffer.

In accordance with the present invention, on demand paging of portions of continuous data files is performed such that a requested movie is guaranteed to be displayed continuously at a viewer unit and multiple requests for the data file are serviced utilizing a limited amount of buffer space. As more fully discussed below, the type of demand paging performed in the present invention provides that the next d bits, or next page, of the requested movie are made available in the buffer 26 for transfer to the local buffer by the time that the decoder finishes consuming the previous d bits of a currently referenced page. In other words, a page of a requested movie must be available in the buffer 26 for transfer to a local buffer of a viewer unit in accordance with the corresponding transfer rate of the movie.

In the server 14, the lines 23 are comprised of a plurality of disk bandwidth units, and only one page of a movie can be transmitted over a disk bandwidth unit at a time. Hereinafter, the retrieval of a page of data from a disk for transfer to the buffer 26 within a time period T is referred to generally as a disk access. The number of disk bandwidth units which are required for concurrently servicing multiple requests, therefore, depends on the size d of a page of a movie data which is stored in the buffer 26 as well as the duration that a page of data which is stored in the buffer 26, known as the pinning duration. A page that is pinned in the buffer 26 cannot be replaced or erased until the pinning duration ends. The number of pages that can be retrieved from disk into the buffer 26 in time T is the maximum disk bandwidth, m, of the server 14. The value of m depends on the page size d as well as the disk scheduling technique. The disk bandwidth capacity of the lines 23, the size of the buffer 26 and the allocation of disk bandwidth and buffer space for servicing multiple admitted requests, thus, determine how many requests can be admitted and serviced concurrently at the transfer rates corresponding to the requested movies.

In one aspect of the present invention, a page that a request for a movie currently references and the next page following the currently referenced page are always simultaneously pinned in the buffer 26 in order to guarantee servicing of multiple requests for the movie at the corresponding transfer rate using on demand paging. Hereinafter, the technique of pinning the next referenced page and the currently referenced page in the buffer 26 is referred to as pinned demand paging (PDP). As more fully discussed below, PDP provides that sufficient resources are allocated to guarantee that whenever an admitted request references a page, the page is already stored in the buffer 26. Similar to other known demand paging techniques, PDP provides that multiple admitted requests may concurrently share the data of a movie which was paged to the buffer 26 for servicing a previously received request for the movie.

In a preferred implementation of PDP, the initial d bits, or first page, of a movie stored on disk in the cache 24 are permanently stored in the buffer 26 to provide that a new request which is admitted may be serviced immediately, or at a response time equal to zero. The processor 20, therefore, admits a new request only if the available disk bandwidth and buffer space resources provide that the new request can be serviced immediately at the corresponding transfer rate, while all other previous requests also can be serviced at the corresponding transfer rate. It is to be understood, however, that the methods of this invention are similarly applicable if the first page of a movie is not stored in the buffer 26, in which case the worst case response time for an admitted request is T units of time.

For ease of reference, the time or phase difference between any two requests $R_i$ and $R_j$ for the same movie, which arrive at the server 14 at times $a_i$ and $a_j$, respectively, is defined as $ph(R_i, R_j)$ and is at least one unit of time. Further, any portion of a page which is being paged to the buffer 26 is assumed not available for transfer to a viewer unit until the entire page is loaded into the buffer 26.

Figure 2:
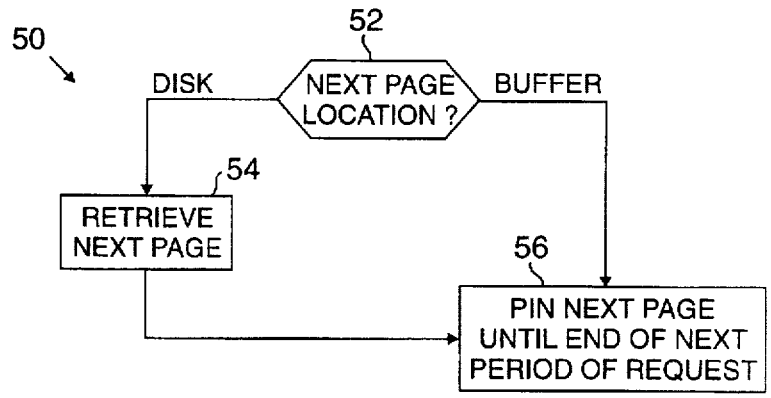
FIG. 2 is a flow diagram of a method for admitting requests in accordance to the present invention by always pinning in a buffer the next page following the page currently being referenced by an admitted request.

FIG. 2 shows a generalized PDP process 50 for processing a new request which references a page of a movie for the first time to guarantee servicing of this request at the corresponding transfer rate. For purposes of clarity, it is assumed that the server 14 has sufficient buffer space and disk bandwidth for servicing this new request. In step 52, the processor 20 determines whether the next page that the request will reference is either on a disk in the cache 24 or already pinned in the buffer 26. If the page is on disk, then in step 54, the processor 20 pages the next page from the cache 24 over the lines 23 to the buffer 26. In step 56, which is executed after step 54, the processor 20 provides control signals to the buffer 26 for pinning the next page until the end of the next period of the request. If at step 52 the page is already stored in the buffer 26, the processor 20 also executes step 56. For example, if a time t denotes the time when a request references a page for the first time, then the next page is pinned in the buffer 26 until time t+2T.

To highlight the advantages of PDP, it is assumed that the viewer units $16_{1,2,...,x}$ have previously transmitted to the server 14 a set of requests $G_j=\{R_i, R_{i+1}, ... R_{i+k}\}$ which are currently being serviced. The requests of the set $G_j$ are ordered by their arrival times, such that the first request, $R_i$, arrived before the second request, $R_{i+1}$, and so on. $G_j$ is defined as an active group if a disk bandwidth unit on the lines 23 must be allocated for accessing pages from disk in the cache 24 for transfer to the buffer 26 for servicing only the earliest or first request $R_i$. An active group of requests becomes passive once not one request in the group further requires disk accesses over the lines 23. The span of a group is defined as the maximum number of pages that are pinned in the buffer 26 at any time for servicing all the requests within a group. For purposes of reference, the earliest and latest requests of the group $G_j$ are defined as $R_j^e$ and $R_j^l$, respectively. A group of requests, therefore, can access at most $\lceil ph(R_j^e, R_j^l)/T \rceil + 1$ pages at any given time. The page that the earliest request will consume next must also simultaneously be pinned until $R_j^e$ references the page before the last page of the movie to guarantee that the next page is in the buffer 26 when $R_j^e$ references that page. As a result, the span of a group, such as the group $G_j$, is equal to $\lceil ph(R_j^e, R_j^l)/T \rceil + 2$ pages. For example, if a group consists of only one request, in other words, $R_j^e = R_j^l$ and $ph(R_j^e, R_j^l) = 0$, then the span and, thus, the buffer requirement of the group is equal to 2 pages.

Figure 3:
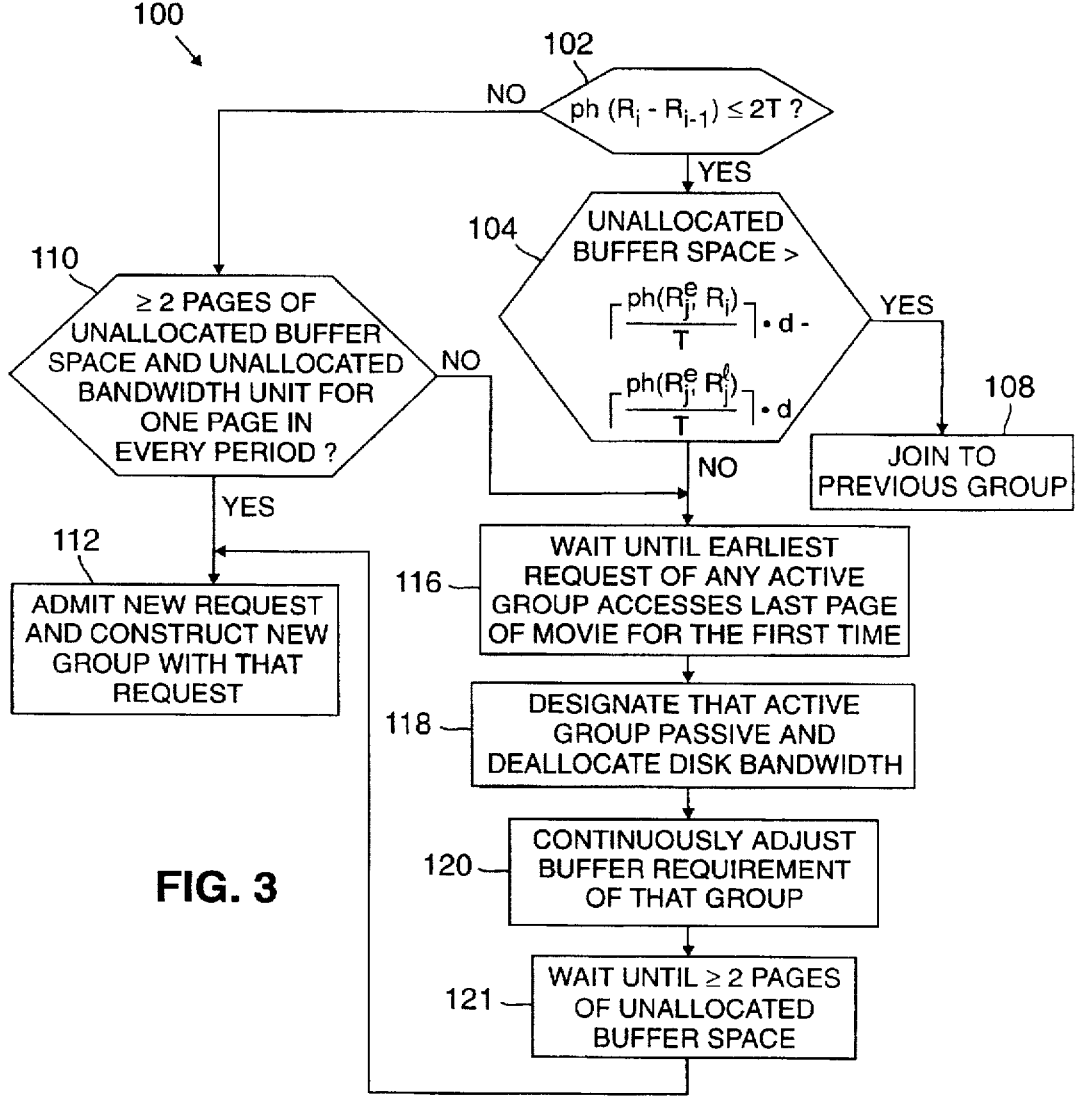
FIG. 3 is a flow diagram of a method for optimizing the use of available disk bandwidth in a continuous media server in accordance with the present invention using a type of demand paging called pinned demand paging (PDP).

FIG. 3 shows a PDP process 100 for optimally utilizing disk bandwidth units in the server 14 for concurrently servicing multiple requests for a single movie. By way of example and for purposes of clarity, it is assumed that the server 14 is currently servicing the group, $G_j$, of previous requests for the movie when a new request $R_i$ for the same movie arrives at a time $a_i$. In step 102, the processor 20 determines whether the phase difference between the new request $R_i$ and the previous request $R_{i-1}$ is less than or equal to 2T. If yes, step 104 is executed for determining whether the request $R_i$ may be admitted.

In step 104, the processor 20 determines whether non-allocated space in the buffer 26 exceeds the buffer space, $B_i$, required for admitting the request $R_i$, where:

$$B_i = \lceil ph(R_j^e, R_i)/T \rceil \cdot d - \lceil ph(R_j^e, R_j^l)/T \rceil \cdot d \quad [1]$$

In equation [1], the first term refers to the buffer space which would be required for servicing all requests currently included in the group $G_j$ and the new request $R_i$, and the second term refers to the buffer space required for servicing all requests currently included in the group $G_j$. If sufficient buffer space exists, in step 108, the processor 20 joins the request $R_i$ to the group $G_j$. It is noted that disk bandwidth does not need to be allocated for servicing $R_i$ because, at the time when a page is transferred from the buffer 26 to a local buffer for servicing $R_i$, the next page that $R_i$ references is already in the buffer 26 due to the previous request $R_{i-1}$.

In the case where the condition in step 102 is not satisfied, in step 110, the processor 20 determines whether an additional disk bandwidth unit and sufficient additional buffer space is available for admitting the request $R_i$. In particular, at step 110, the processor 20 determines whether at least one disk bandwidth unit for a page is not being utilized in every period T and whether greater than or equal to 2 pages of non-allocated buffer space exists. If both conditions of step 110 are satisfied, in step 112, the processor 20 constructs a new singleton group commencing with the request $R_i$. The buffer requirement, $B_i$, for the two pages of this newly constructed group is equal to 2d.

In the event that both conditions of step 110 are not satisfied or the amount of non-allocated buffer space is determined not sufficient in step 104, then in step 116, the processor 20 waits until the earliest request of any active group accesses the last page of the movie for the first time. When this event occurs, a disk bandwidth unit is no longer required for servicing any request within that group. At that time, in step 118, the processor 20 designates that group as passive and deallocates the disk bandwidth unit which was being utilized for servicing that group. Then in step 120, the processor 20 reduces the buffer requirement for that group by one page each time that the latest request in the group accesses a page. In step 121, the processor 20 waits until at least 2 pages of non-allocated buffer space are available in the buffer 26, based on the continuous re-allocation of buffer space for the group that was designated passive in step 118. When the condition in step 121 is satisfied, step 112 is executed for admitting the request $R_i$, as explained above. Thus, a group formed in accordance with the PDP process 100 includes a set of requests each of which follows the previous request of the group with a phase difference of at most 2T.

In operation, the server 14 in the worst case would receive m requests, where each request follows the previous request with a phase difference of at least 2T+1 units of time. In accordance with PDP, the processor 20 must allocate one disk bandwidth for each of the m requests and, therefore, in the worst case, can admit only m such concurrent requests for a movie, provided that buffer space is sufficient. Furthermore, the worst case length of time for which a new request cannot be admitted is 1−m·(2T+1)−T units of time, where l is the length of the movie in units of time. The worst case admission time occurs if at the time a new request arrives, the previous request has been transmitting data for (2T+1) units of time and there are m admitted requests, each of which follows the previous one with a phase difference of 2T+1 units of time. A new request cannot be admitted until the earliest request accesses the last page for the first time, that is, for 1−m·(2T+1)−T units of time.

In one preferred embodiment of the PDP processes 50 and 100, the page size d of a movie of length, l, is stored on a disk in the cache 24 such that the movie consists of at most 2m pages, where the page size is determined according to the relationship: $d \geq l \cdot r/(2m)$. Varying the size of a page which is stored on disk with respect to the length of a movie provides that any request for a particular movie will be admitted for the PDP process 100, as long as sufficient space is available in the buffer 26. The number of pages of a movie that are pinned in the buffer 26 at a given time depends on the number of requests for the movie and the phase difference between these requests. As the number of requests may range from two pages to all the pages of the movie, in the worst case, m requests are sufficient to load the entire movie into the buffer 26.

In another preferred embodiment of the PDP processes 50 and 100, the page size of a movie stored on disk is fixed in size, but the pinning duration for pages stored in the buffer 26 is determined in accordance with the length and the transfer rate of the movie and the maximum disk bandwidth of the server 14. The pinning duration is suitably selected to provide that at most m disk accesses are necessary during a period T under any workload, or number of concurrent requests, in order to ensure that any number of requests for a movie may be admitted. The selection of only one, or a few, fixed page sizes which are independent of the length and the transfer rate of the movie may be desirable to optimize system criteria, such as disk bandwidth utilization.

Referring to FIG. 2 and the accompanying text above, variable pinning durations may be implemented in the PDP process 50 by modifying step 56 such that the next page is pinned in the buffer 26 until time t+2k·T, where k is the smallest integer that satisfies the following condition:

$$k \cdot d \geq \frac{l \cdot r}{2m} . \qquad [2]$$

The relationship [2] provides that if a request $R_i$ follows another request $R_{i-1}$ with a phase difference of at most 2k·T, then when $R_i$ accesses a page for the first time, the next page to be accessed always will be pinned in the buffer 26. As the first page of a movie is in the buffer 26, disk retrieval is not necessary for $R_i$. Also, at most m active groups will exist at any time because m·(2k·T+1)≦1−T. Therefore, sufficient disk bandwidth for admitting any number of requests for a movie will always exist, provided buffer space is sufficient.

The buffer requirements associated with the variable pinning duration implementation of PDP are as follows. A group consists of requests, each of which follows the previous request with a phase difference of at most 2k·T. The maximum number of pages that will be pinned at a given time for any request $R_i$, which is at least 2k·T+1 units of time apart from the previous and following requests, is 2k+1. The pages pinned include the page that $R_i$ is accessing currently, the next page and the preceding 2k−1 pages. Accordingly, the variable pinning duration embodiment may be implemented in the process 100 by modifying step 102 to require that the phase difference between $R_i$ and $R_{i+1}$ is compared to 2k·T, instead of 2T. If the condition in modified step 102 is true, the processor 20 performs steps 104 and 108 as described above and joins $R_i$ to the previous group where the buffer 26 has available the required buffer space $B_i$, as set forth in equation [1].

Otherwise, if the phase difference between the previous request $R_{i-1}$ and $R_i$ is greater than 2k·T upon the arrival of $R_i$, the processor 20 then performs a modified step 112, which provides for the construction of a new singleton group from $R_i$ requiring (2k+1)·d of buffer space, provided such space exists. As such, steps 110, 116, 118, 120 and 121 would be eliminated from the PDP process 100 for admitting a request when implementing the principles of the variable pinning duration embodiment.

Further, in the variable pinning duration embodiment, the processor 20 re-allocates buffer space when the earliest request of a group accesses the page before the last page of the movie for the first time. The processor 20 may execute this buffer space re-allocation by performing steps 116 and 118 of the process 100, and then step 120 as modified below. In modified step 120, the processor 20 adjusts buffer requirements for a group as described in step 120 above, except that when the latest request in the group completes the transmission of the movie, the last 2k−1 pages are unpinned and the buffer requirement of the group is set to zero. As in the variable paging size PDP embodiment, m requests are sufficient to load the entire movie into the buffer 26.

In another aspect of the invention, a demand paging technique, called shortest distance pinning (SDP), may be implemented in the system 10 for minimizing the buffer requirements for concurrently servicing multiple requests in accordance with the PDP principles of ensuring that the next page to be referenced is available in the buffer whenever a request references that page. The use of space in the buffer is continuously manipulated in order to maintain the number of disk bandwidth accesses for a page of a movie equal to at most m−1 in the steady state, in other words, the state where there are at most m−1 active groups and m is greater than 1, regardless if more than m requests are concurrently being serviced. The total disk bandwidth requirement is maintained at most equal to m by dynamically increasing and decreasing the number of requests in groups in accordance with the total number of requests which require servicing. The remaining disk bandwidth unit provides that sufficient disk bandwidth always exists for servicing a newly arrived request. SDP optimizes the total buffer requirement for multiple requests based on the use of an arbitrary page size d. For any set of requests, buffer space allocated according to SDP will require at most $3m \cdot d + 2 \cdot r \cdot \min_j \{ph(R_j^l, R_{j+1}^e)\}$ more buffer space than the lower bound on the buffer requirement of known demand paging algorithms, where $\max_{j,i}\{ph(R_j^i, R_{i+1}^j)\}$ is the maximum phase difference between any two consecutive requests within a group under SDP. Furthermore, the buffer requirement of SDP is the same as that of PDP when there are less than m−1 groups.

SDP is based on an arbitrary period T, such that the page size is $d = T \cdot r$. The size of the groups are dynamically increased and decreased depending on the incoming requests and the requests being serviced, such that the total buffer requirement is maintained low while the total disk bandwidth requirement is at most m. In SDP, the phase difference between two consecutive requests within a group depends on the workload. The earliest request $R_j^e$ in each active group $G_j$ pins the pages for all other requests within $G_j$. For each page, the appropriate pinning duration is selected so that the page will be in the buffer when all other requests in the group access the page. To achieve this result, the pinning duration for each group $G_j$ is selected as $ph(R_j^e, R_j^l) + 2T$. Furthermore, in the steady state of SDP, there are at most m−1 active groups. The remaining disk bandwidth is reserved for incoming requests, such that whenever a new request arrives there is always enough disk bandwidth to service the request.

SDP includes three basic operations for reducing buffer requirements for servicing multiple requests by executing a limited number of disk accesses each period. These operations include group joining, group combination and group partition, which are at this point described in connection with FIGS. 4A, 4B and 4C, respectively. Admission of requests in accordance with SDP and these operations is explained in further detail below in connection with FIGS. 5A, 5B and 6.

Figure 4A:
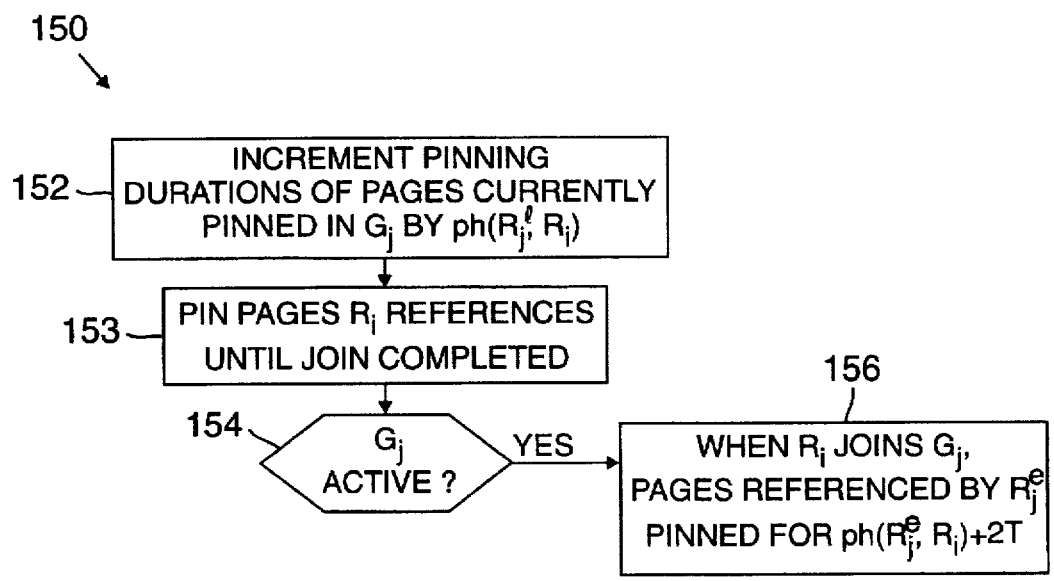
FIG. 4A is a flow diagram of a method for joining a new request to a group in accordance with the present invention using a type of demand paging which incorporates the aspects of PDP and is called shortest distance pinning (SDP).

FIG. 4A shows a process 150 for group joining according to SDP. By way of example, a new request $R_i$ is added or joined to the latest group $G_j$. Upon initiation of a join operation for joining $R_i$ to $G_j$, in step 152, the processor 20 increments by $ph(R_j^l, R_i)$ the pinning durations of the pages currently pinned for $G_j$. In step 153, the processor 20 pins in the buffer 26 the pages that $R_i$ references, as if $R_i$ constitutes a singleton group, until the join operation completes. For example, if $R_i$ accesses a page for the first time at time t and t is before the completion of the join operation, then $R_i$ will pin the next page until time t+2T after requesting the retrieval of the next page if that page is not in the buffer 26. In step 154, the processor 20 determines if $G_3$ is an active group. If yes, in step 156, the processor 20 is initiated to provide for pinning of the pages that the request $R_j^e$ references for a duration of $ph(R_j^e, R_i) + 2T$ from the moment that the processor 20 joins $R_i$ to the group $G_j$. The earliest request $R_j^e$ in each active group $G_j$ pins the pages for all other requests within $G_j$ for a duration equal to $ph(R_j^e, R_j^l) + 2T$ to ensure that the page referenced by $R_j^e$ is in the buffer 26 when all other requests in the group reference that page. If $R_j^e$ has not referenced the page before the last page of the movie, then the buffer space required for $R_i$ to join $G_j$ is equal to $\lceil ph(R_j^e, R_i)/T \rceil \cdot d - \lceil ph(R_j^e, R_j^l)/T \rceil \cdot d$. Otherwise, the buffer space required is $\lfloor ph(R_j^l, R_i)/T \rfloor \cdot d$. If $R_j^l$ accesses the $p^{th}$ page at the time the join operation is initiated, then the join operation completes when $R_i$ accesses the $(p-1)^{th}$ page for the first time. As of that moment, disk accesses will not be necessary for $R_i$. In other words, $R_i$ is completely joined to $G_j$ because disk bandwidth units are not necessary for servicing $R_i$'s page references. If $ph(R_j^l, R_i)$ is at most 2T, then the join occurs immediately, in other words, within one unit of time. Otherwise joining can persist for at most $ph(R_j^l, R_i) - T$ time units.

Figure 4B:
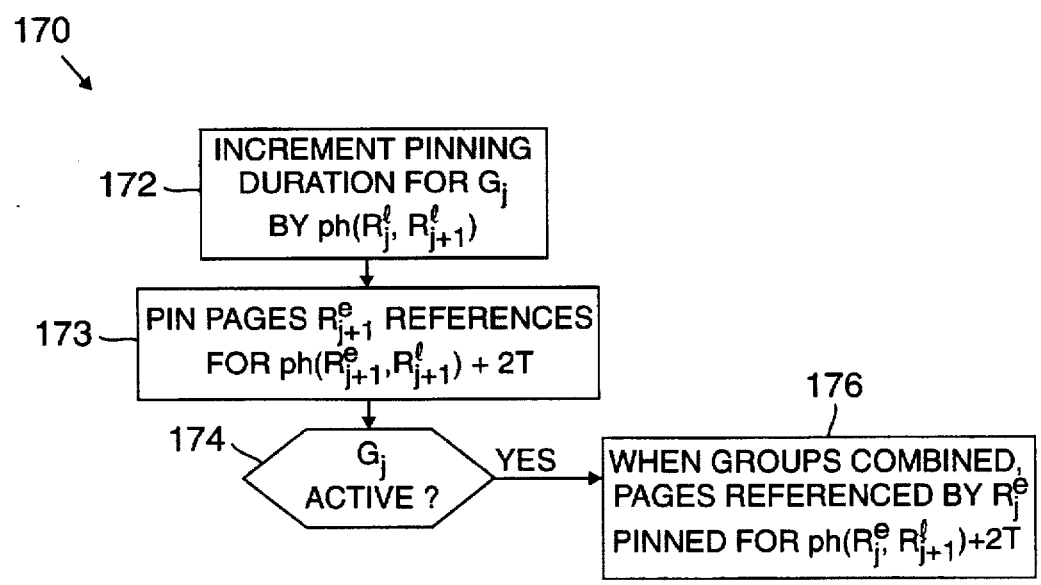
FIG. 4B is a flow diagram of a method for combining one group with another in accordance with SDP.

FIG. 4B shows a process 170 for performing a group combination according to SDP. By way of example, a first group $G_j$ is combined with a second group $G_{j+1}$ to form a singular group, where $G_{j+1}$ and $G_j$ are two consecutive groups, $G_{j+1}$ following $G_j$, and the phase difference between the earliest request of $G_{j+1}$ and latest request of $G_j$ is more than 2T. In combining the groups $G_{j+1}$ and $G_j$, in step 172, the processor 20 increments the pinning durations of the pages currently pinned for the group $G_j$ by $ph(R_j^l, R_{j+1}^l)$. In step 173 the processor 20 pins in the buffer 26 the pages that the request $R_{j+1}^e$ references for a duration of $ph(R_{j+1}^e, R_{j+1}^l) + 2T$ until the combine operation completes. In step 174, the processor 20 determines if $G_j$ is an active group. If yes, in step 176 the processor 20 is initiated to pin the pages that $R_j^e$ references for a duration of $ph(R_j^e, R_{j+1}^l) + 2T$ from the moment the groups are combined. If $R_j^e$ has not referenced the page before the last page of the movie, then the buffer space required for combining $G_{j+1}$ and $G_j$ is equal to: $\lceil ph(R_j^e, R_{j+1}^l)/T \rceil \cdot d - \lceil ph(R_j^e, R_j^l)/T \cdot d - \lceil ph(R_{j+1}^e, R_{j+1}^l)/T \rceil \cdot d - 2$. Otherwise, the buffer space required for combining $G_{j+1}$ and $G_j$ is equal to $(a-b-2) \cdot d - \lceil ph(R_{j+1}^e, R_{j+1}^l)/T \rceil \cdot d$, where the movie has n pages and $R_{j+1}^l$ is referencing the $(n-a)^{th}$ page of the movie and $R_j^l$ is referencing the $(n-b)^{th}$ page of the movie. If $R_j^l$ accesses the $p^{th}$ page at the time the combine operation is initiated, then the combine operation completes when $R_{j+1}^e$ accesses the $(p-1)^{th}$ page for the first time. Upon the completion of the combine operation, disk accesses will not be necessary for $G_{j+1}$. Combining the two groups will take at most $ph(R_j^l, R_{j+1}^e) - T$ time units.

Figure 4C:
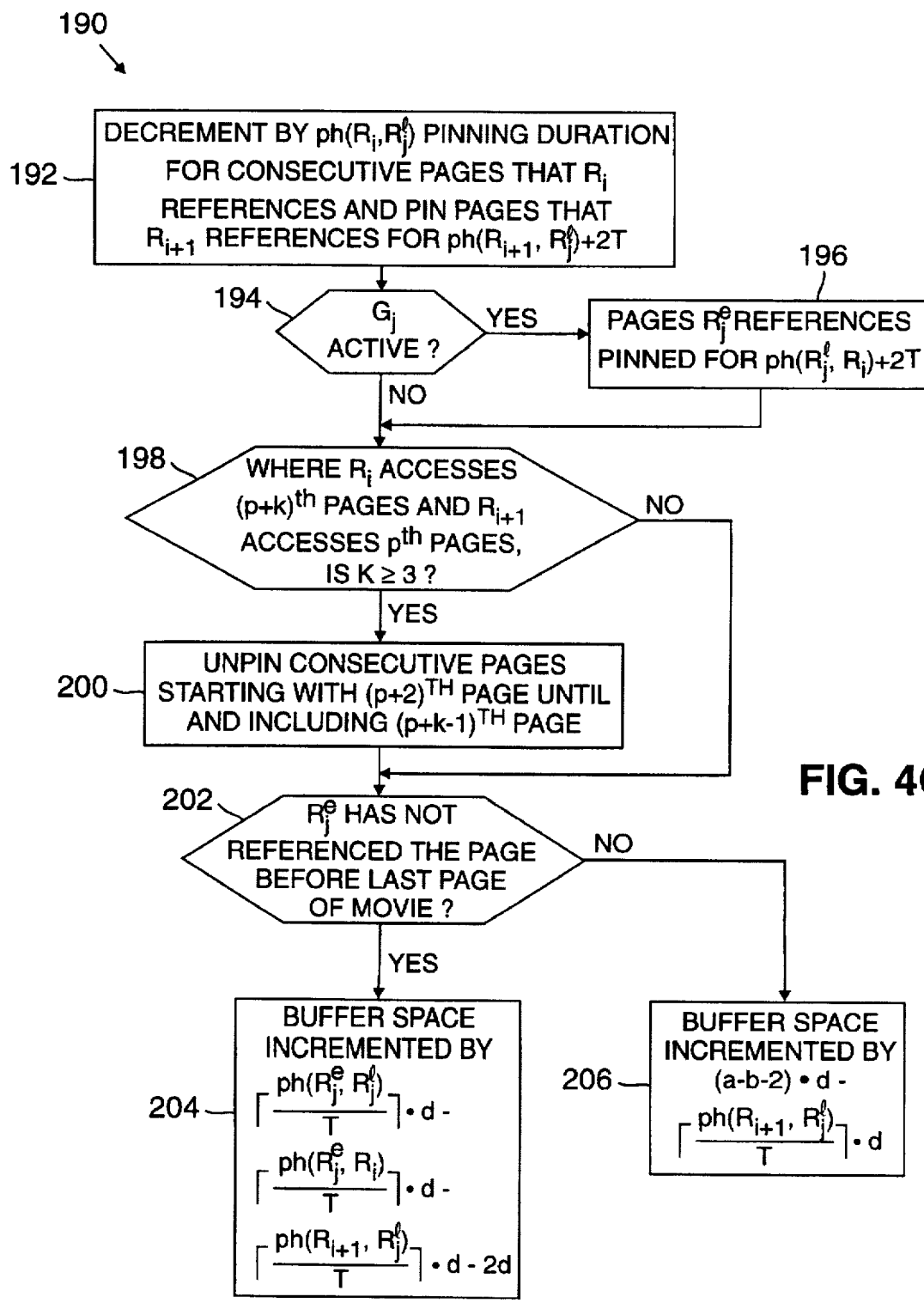
FIG. 4C is a flow diagram of a method for partitioning a group in accordance with SDP.

FIG. 4C shows a process 190 for performing group partition to conserve buffer space in accordance with SDP. As explained below, group partition is perfomed on a group which includes requests spaced so far apart in time so as to cause large amounts of data, or many pages, to be pinned in the buffer 26. For purposes of illustration, $R_{i+1}$ and $R_i$ are two consecutive requests within a group $G_j$, such that $R_{i+1}$ follows $R_i$ with a phase difference greater than 2T. Further, it is assumed that $R_{i+1}$ and $R_i$ access the $p^{th}$ and $(p+k)^{th}$ pages, respectively.

In step 192, the processor 20 decrements by $ph(R_i, R_j^l)$ the pinning durations of the consecutive pages that $R_i$ references starting from the page that $R_i$ is currently referencing through the last page that is pinned for $G_j$. Also, the processor 20 is initiated to pin the pages that $R_{i+1}$ references for a duration of $ph(R_{i+1}, R_j^l) + 2T$. In step 194, the processor 20 determines if $G_j$ is an active group. If yes, in step 196, the processor 20 pins the pages that $R_j^e$ references for a duration of $ph(R_j^e, R_i) + 2T$. Step 198 is then executed after step 194 or step 196.

In step 198, the processor 20 determines whether the $(p+k)^{th}$ pages being accessed by $R_i$ are at least three pages following the $p^{th}$ pages being accessed by $R_{i+1}$, in other words, k is greater than or equal to three. If yes, in step 200, the processor 20 unpins from the buffer 26 all the pages starting with the $(p+2)^{th}$ page until and including the $(p+k-1)^{th}$ page. If not, step 202 is executed.

After step 198 or 200, in step 202, the processor 20 determines whether $R_j^e$ has not referenced the page before the last page of the movie. If yes, in step 204, the processor 20 increments the amount of non-allocated buffer space by $\lceil ph(R_j^e, R_j^l)/T \rceil \cdot d - \lceil ph(R_j^e, R_i)/T \cdot d - \lceil ph(R_{i+1}, R_j^l)/T \rceil \cdot d - 2d$. Otherwise, in step 206, the processor 20 increments the amount of non-allocated buffer space by $(a-b-2) \cdot d - \lceil ph(R_{i+1}, R_j^l)/T \rceil \cdot d$, where the movie has n pages and $R_j^l$ is referencing the $(n-a)^{th}$ page of the movie and $R_i$ is referencing the $(n-b)^{th}$ page of the movie.

As referred to above, SDP provides for near optimal re-allocation of available disk bandwidth and buffer space for servicing multiple requests. In particular, SDP performs operations for the following events: (1) the earliest request in a group references a page for the first time; (2) the arrival of a new request; (3) the completion of a combine or join operation; (4) the transition of a group from active to passive; and, (5) the deallocation of buffer space for the earliest group. For purposes of illustration, it is assumed that the server 14 attends to processing related to these events atomically, within a unit of time. If several of these events occur concurrently, then the events (5) and (4) have priority over the events (3) and (2), and the event (3) has priority over the event (2). Furthermore, for a particular movie, only one of the events (2), (3), (4) and (5) can occur at any given time. For any other variations in the occurrence of events (1)–(5), processing is performed in any order.

When an event (1) is detected, the processor 20 performs the steps of the PDP process 50 described above, except with a modification in step 56, for retrieving the next page from disk into the buffer 26. In particular, modified step 56 provides for pinning the next page in the buffer 26 until time $t + ph(R_j^e, R_j^l) + 2T$, where t is the time that the earliest request $R_j^e$ in a group $G_j$ references a page other than the last page of the movie for the first time.

Figure 5A:
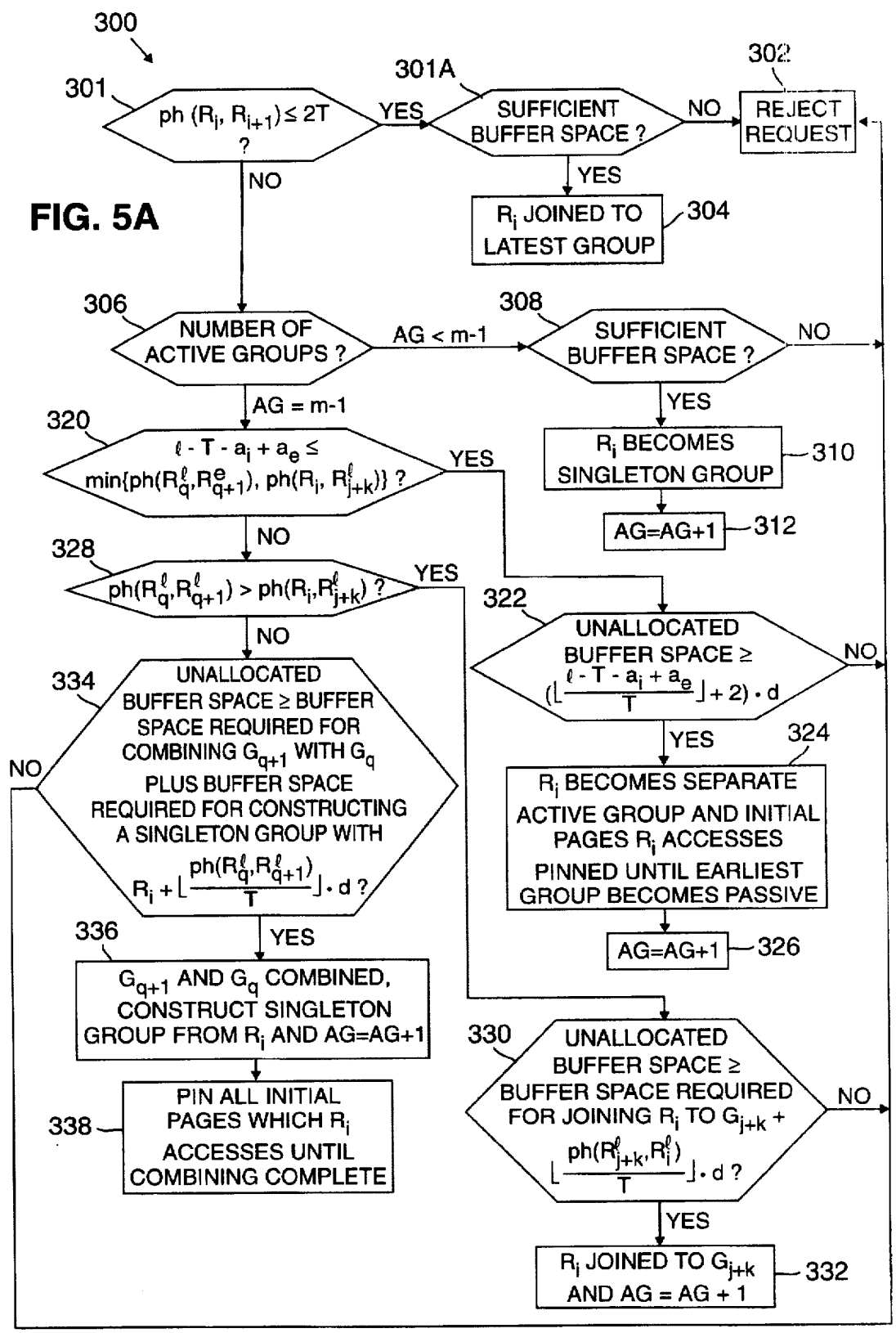
FIG. 5A is a flow diagram of a method for admitting a new request in accordance with SDP.

FIG. 5A shows a process 300 that the processor 20 performs when an event (2) is detected. In step 301, the processor 20 determines whether the phase difference between a new request $R_i$ and a previous request $R_{i-1}$ is at most 2T. In step 301A, the processor 20 determines using equation [1] whether sufficient space in the buffer 26 exists for admitting the new request. If space is sufficient, step 304 is performed. Otherwise, in step 302, the request is not admitted. In general, when a request is not admitted because buffer space is insufficient or disk bandwidth is unavailable, the client is provided with an indication of the rejection. The client, in this circumstance, may attempt the request at a later time. In step 304, the processor 20 joins $R_i$ to the latest group which includes the previous request $R_{i-1}$ in accordance with the process 150.

In the case where the phase difference determined at step 301 is more than 2T, then in step 306, the processor 20 determines the number of active groups of requests, AG, for a movie from a value stored in a counter in the memory 21 which the processor 20 suitably updates using conventional techniques. If AG<m−1, in step 308, the processor 20 determines whether sufficient buffer space is available for forming a new group with $R_i$. If yes, in step 310, the processor 20 constructs a new singleton group from $R_i$ using 2 pages of buffer space. If buffer space is insufficient, step 302 is performed. After step 310, in step 312, the processor 20 suitably increments AG by one.

In the case where AG=m−1 at step 306, the retrieval of data for servicing $R_i$ would cause the number of active groups to become equal to m, or the maximum bandwidth. To ensure that a bandwidth unit is allocated for admitting subsequent requests, the number of active groups must be reduced to m−1. The processor 20 may achieve this result by either joining $R_i$ to the latest group $G_{j+k}$ or, if there are at least two earlier consecutive groups, by combining the two consecutive groups $G_{q+1}$ and $G_q$, where $G_{q+1}$ follows $G_q$, such that $ph(R_g^l, R_{q+1}^e)$ is equal to $\min_j\{ph(R_j^l, R_{j+1}^e)\}$, when a new group is constructed for $R_i$. On the other hand, if the earliest group is not passive and the duration in which it will become passive is less than or equal to the minimum of $ph(R_q^l, R_{q+1}^e)$ and $ph(R_i, R_{j+k})$ then a combine or join operation need not be performed. In this case, $R_i$ can simply constitute a separate active group.

Further, to ensure immediate admission of new requests that arrive after $R_i$ while a join, combine or transition of the earliest group to passive is occurring, the pages initially pinned by $R_i$ remain pinned until these operations are completed. Of course, during this interim, an unallocated bandwidth does not exist for servicing new requests. The steps 320 through 338 below describe the operations which need to be performed for maintaining at least one unallocated bandwidth unit when AG becomes equal to m.

In step 320, the processor 20 determines, where $a_e$ is the arrival time of the earliest request in the earliest active group, whether $$t - T - a_i + a_e \leq \min\{ph(R_q^l, R_{q+1}^e), ph(R_i, R_{j+k}^l)\}. \quad [5]$$

If yes, in step 322, the processor 20 determines whether the non-allocated space in the buffer 26 is greater than or equal to:

$$\left( \left\lfloor \frac{t - T - a_i + a_e}{T} \right\rfloor + 2 \right) \cdot d$$

If yes, in step 324, the processor 20 constructs a separate active group from $R_i$ and pins the initial pages that $R_i$ accesses until the earliest group becomes passive. The time for the earliest group to become passive is equal to $1 - T - a_i + a_e$, and the maximum number of pages that $R_i$ pins in that time is equal to $$\left\lfloor \frac{t - T - a_i + a_e}{T} \right\rfloor + 2.$$

In step 326, the processor 20 increments the number of active groups by one. As indicated below, the number of active groups AG is decremented by one when the earliest group becomes passive.

If the condition in step 320 is not satisfied, in step 328, the processor 20 determines whether $ph(R_q^{\prime}, R_{q+1}^e) > ph(R_i, R_{j+k}^i)$ is true. If yes, in step 330, the processor 20 determines if the unallocated buffer space is greater than or equal to the buffer space required for joining $R_i$ to $G_{j+k}$ plus $\lfloor ph(R_{j+k}^{\prime}, R_i)/T \rfloor \cdot d$. If yes, in step 332, the processor 20 joins $R_i$ into $G_{j+k}$ and increments AG by one. The requirement that the buffer space include $\lfloor ph(R_{j+k}^{\prime}, R_i)/T \rfloor \cdot d$ additional unallocated pages ensures that there is sufficient buffer space for pinning the initial pages that $R_i$ accesses until the join completes, where the join operation lasts at most $ph(R_{j+k}^{\prime}, R_i) - T$ units of time. As discussed below, the number of active groups AG is decremented by one when the join operation is completed.

If the condition in step 328 is not satisfied, in step 334, the processor 20 determines whether the unallocated buffer space is greater than or equal to the buffer space required for combining $G_{q+1}$ to $G_q$ plus the buffer space required for constructing a singleton group with $R_i$ plus $\lfloor ph(R_q^{\prime}, R_{q+1}^i)/T \rfloor \cdot d$. If no, step 302 is executed. If yes, in step 336, the processor 20 combines $G_{q+1}$ and $G_q$, constructs a singleton group from $R_i$ and increments AG by one until the combined operation completes. The additional $\lfloor ph(R_q^{\prime}, R_{q+1}^i) \rfloor \cdot d$ pages of buffer space are allocated to ensure that the pages that $R_i$ accesses from disk can be pinned until the combine completes. Then in step 338, the processor 20 pins the pages that $R_i$ initially references until combining is completed.

If at step 306 AG=m, then the implication is that either two groups are being combined or a request which arrived previously is being joined to the previous group. In this case, neither buffer space nor disk bandwidth is re-allocated because the request that initiated the join or combine operation has caused the initial pages which are accessed to be pinned until the join or combine operation is completed or the earliest group becomes passive. Once any of these events occur, the new request $R_i$ will be in the same group as the previous request $R_{i-k}$.

Figure 5B:
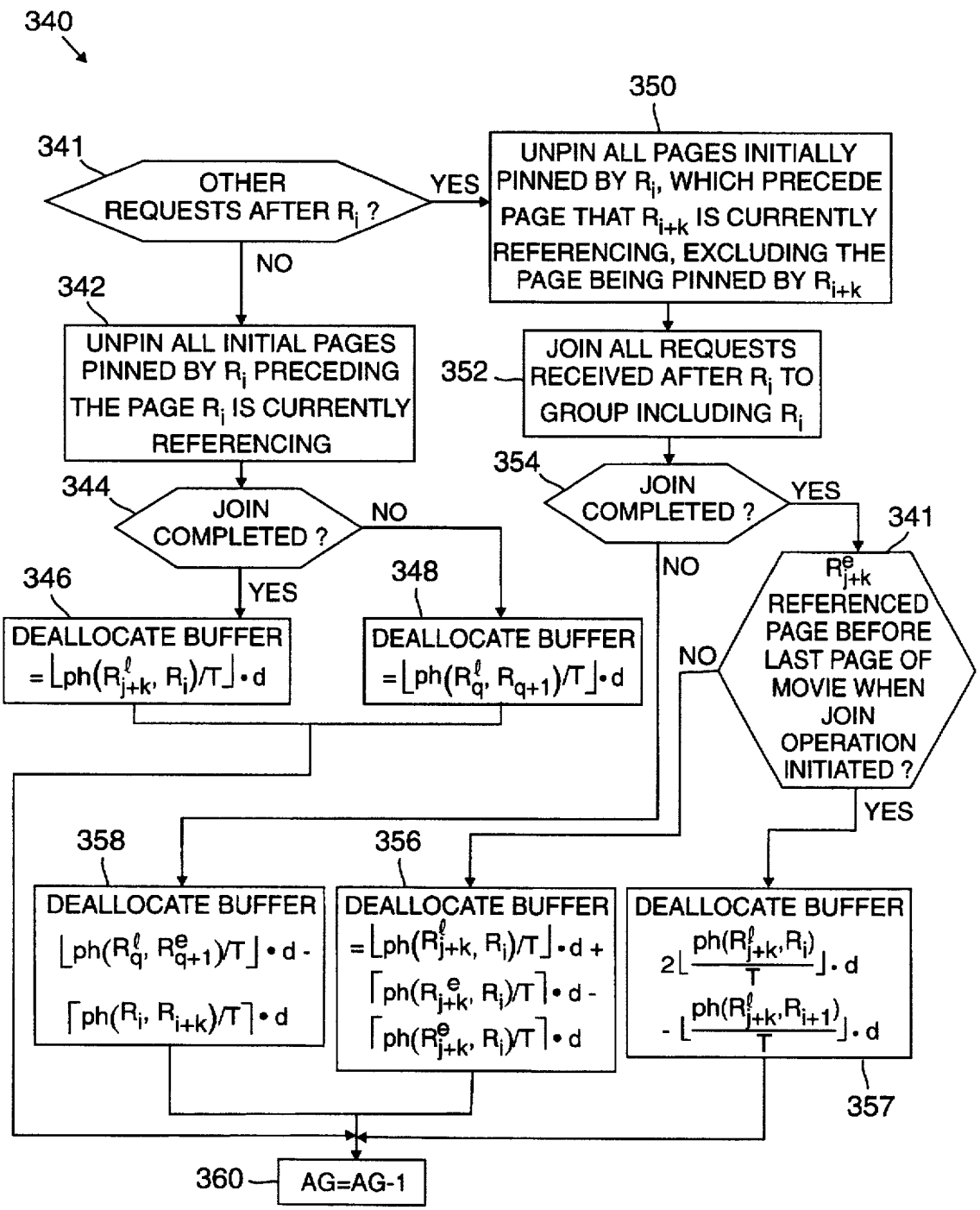
FIG. 5B is a flow diagram of a method for re-allocating buffer space and disk bandwidth resources after a combine or join operation is completed in accordance with SDP.

Once the processor 20 detects that a join or combine operation completes, in other words, an event (3) occurs, the processor 20 begins to adjust the allocation of the buffer space and disk bandwidth resources in accordance with a process 340, shown in FIG. 5B. For ease of reference, $R_i$ is defined as the request which caused initiation of the combine or join operations, $G_{j+k}$ is defined as the previous group if the join operation was performed and $G_{q+1}$ and $G_q$ are defined as the groups that are combined if the combine operation was performed.

Referring to FIG. 5B, in step 341, the processor 20 determines whether any other request has arrived after $R_i$. If not, in step 342, the processor 20 unpins all the pages which were pinned in the buffer 26 for servicing the request $R_i$ and precede the page that $R_i$ is currently referencing. Then, in step 344, the processor 20 determines if a join operation was completed for $R_i$. If yes, in step 346, the processor 20 deallocates space in the buffer 26 equal to $\lfloor ph(R_{j+k}^{\prime}, R_i)/T \rfloor \cdot d$. Otherwise, if a combine operation was performed, in step 348, the processor 20 deallocates space in the buffer 26 equal to $\lfloor ph(R_q^{\prime}, R_{q+1}^e)/T \rfloor \cdot d$. step 360 is executed after step 346 or step 348.

In the case where other requests arrived after $R_i$, in step 350, the processor 20 unpins all the pages initially pinned by $R_i$ which precede the page that the latest request, $R_{i+k}$, is currently referencing. Then, in step 352, the processor 20 joins all the requests that arrived after $R_i$ to the group which includes $R_i$. In step 354, the processor 20 determines whether a join operation has just been completed. If yes, in step 355, the processor 20 determines whether, at the time that the join operation was initiated, $R_{j+k}^e$ referenced the page before the last page of the requested movie. If no, in step 356, the processor 20 deallocates space in the buffer 26 equal to:

$$\lfloor ph(R_{j+k}^{\prime}, R_i)/T \rfloor \cdot d + \lfloor ph(R_{j+k}^e, R_i)/T \rfloor \cdot d - \lfloor ph(R_{j+k}^{\prime}, R_{i+k})/T \rfloor \cdot d.$$

If yes, in step 357, $$2 \lfloor \frac{ph(R_{j+k}^1, R_i)}{T} \rfloor \cdot d - \lfloor \frac{ph(R_{j+k}^1, R_{i-1})}{T} \rfloor \cdot d$$

bits of buffer space are deallocated. On the other hand, if a combine operation was just completed, in step 358, the processor 20 deallocates space in the buffer 26 equal to:

$$\lfloor ph(R_q^{\prime}, R_{q+1}^e)/T \rfloor \cdot d - \lfloor ph(R_i, R_{i+k})/T \rfloor \cdot d.$$

Step 360 is executed after steps 356, 357 or 358. In step 360, the processor 20 decrements AG by one.

For concurrently servicing multiple requests using SDP, the processor 20 continuously attempts to detect the occurrence of an event (4) condition, in other words, the circumstance where the earliest request $R_j^e$ of an active group $G_j$ accesses the last page of the movie for the first time. When this occurs, the processor 20 converts the active group to passive according to the steps of a process 370, shown in FIG. 6. In step 372, the processor 20 determines the current number of active groups. If AG<m-1 at step 372, then in step 374, the processor 20 designates the group as passive, and decreases AG by one. If AG=m-1 at step 372, then in step 376, the processor 20 identifies the group that contains two consecutive requests, $R_k$ and $R_{k+1}$, having the largest phase difference between them from among all requests in all groups. For the identified group, in step 378, the processor 20 determines whether the phase difference between $R_k$ and $R_{k+1}$ is greater than 2T. If yes, in step 380, the processor 20 commences partitioning the group into two groups, such that request $R_{k+1}$ is placed in a separate, earlier partitioned group from the group including request $R_{k+1}$. In step 382, the processor 20 determines whether $R_j^e$ is included in the partitioned group. If yes, in step 381 the processor 20 designates the partition containing $R_j^e$ as a passive group. Otherwise, in step 386, the processor 20 designates the group $G_j$ as passive. In the case where the phase difference determined in step 378 is at most 2T, in step 388, the processor 20 reduces AG by one and then executes step 386.

If AG=m at step 372, then the implication is that a request $R_i$ has become an active group and is pinning the initial pages it accesses until $G_j$ becomes passive. In this circumstance, the following operations are performed. In step 392, the processor 20 designates group $G_j$ as passive, and accordingly, sets AG equal to m-1. By way of example, it is assumed that $R_{i+k}$, where $k \geq 0$, is the latest request which arrived after $R_i$. In step 394, the processor 20 unpins the initial pages pinned by $R_i$ preceding and excluding the page that $R_{i+k}$ is currently referencing. Further, all the requests arriving after $R_i$ are joined to $R_i$'s group. In other words, all the new requests that arrived after the request $R_i$ which caused the combine or join operation to be initiated are joined to the group including $R_i$, where $R_i$ is the earliest request in the group. In step 396, the processor 20 deallocates buffer space using the techniques illustrated in the process 100.

Further, when the processor 20 determines that the earliest request of an active group references the page before the last page of the movie for the first time, or the event (5) is detected, the processor 20 similarly re-allocates buffer space requirements for the group using the techniques described for the process 100.

SDP, thus, provides that a new request is admitted and serviced immediately using an available disk bandwidth unit, provided sufficient buffer space exists. Servicing of this request and the subsequent requests while a join, combination or partition is performed provides that multiple requests for a movie may be admitted and serviced immediately, even if the total number of requests exceed m and there are m−1 presently existing active groups.

The PDP and SDP techniques described above may be extended for servicing requests for multiple continuous media data files, such as movies. Multiple continuous media data files may be stored on single or multiple disks using well-known techniques. For example, a system may include multiple movies stored on a single disk, multiple movies striped on a set of disks using the fine-grained striping model, single movies striped separately on a set of disks and multiple movies striped on a set of disks using the course-grained striping model. For a detailed description of the fine-grained and coarse-grained striping models for storing data on and retrieving data from disk, see G. R. Granger et al., "Disk Arrays: High-performance high-reliability storage subsystems," Computer 27(3) (March 1994) pp. 30–36, incorporated by reference herein. It is noted that the storage of multiple videos on a single disk may be characterized for purposes of this invention using the fine-grained striping model.

The PDP disk scheduling techniques described above may be extended for the fine-grained striping model as follows. For purposes of illustration, it is assumed that v movies are included on a set of q disks, such that $r_{disk}$ is equal to the aggregate transfer rate of q disks. If the initial page of each movie is stored in the buffer 26, the buffer space requirement for a new request for a movie $V_i$ is computed based on its phase difference to the previous request for the movie $V_i$. The available disk bandwidth, however, is determined based on the number of active groups of requests for all of the movies.

The variable page size PDP techniques described above also may be extended for servicing multiple movies by selecting a value for the period T which satisfies $$T \geq \sum_{i=1}^{v} l_i/(2m).$$

Furthermore, if the condition $l_i \bmod T > 0$ is true, the last page of the movie $V_i$ is stored in the buffer 26 to guarantee that the maximum number of disk bandwidth units required for servicing a request for the movie $V_i$ is $$\left\lfloor \frac{l_i}{2T} \right\rfloor.$$

Thus, the maximum aggregate disk bandwidth required for servicing requests for v movies is $$\sum_{i=1}^{v} \left\lfloor \frac{l_i}{2T} \right\rfloor,$$

which is less than or equal to $$\sum_{i=1}^{v} l_i/(2T).$$

The maximum aggregate disk bandwidth is greater than or equal to m because of the value selected for T, thereby ensuring that sufficient disk bandwidth will always exist for any given set of requests.

The variable pinning duration PDP techniques described above similarly may be extended for the fine-grained striping model as follows. The value for k is selected for an arbitrary period T as the smallest integer that satisfies $$k \geq \frac{\sum_{i=1}^{v} \left\lceil \frac{l_i}{T} \right\rceil}{2m}.$$

Further, SDP may be extended for the fine-grained striping model to ensure that there are at most m−v active groups of requests for any of the v movies in the steady state. The remaining disk bandwidth ensures that, whenever a new request arrives for any of the v movies, sufficient disk bandwidth always exists for servicing the new request.

In addition, in the case where multiple movies are stored on multiple disks, the arrival of a new request for a movie $V_i$ may cause a combine operation of two groups of requests for another movie $V_j$, where $i \neq j$. Also, the transition of a group of requests for a movie $V_i$ from active to passive may result in the partition of a group of requests for another movie. Furthermore, the buffer space requirement for servicing a new request for the movie $V_i$ is computed based on its phase difference with the previous request for the same movie as well as the number of active groups of requests to all of the v movies and their phase differences. Therefore, the operations performed for events (2), (3) and (4) of SDP must be changed such that determinations concerning the number of active groups of requests involve all the movies which may be requested; the term $\min_j (R_j^i, R_{j+1}^i)$ denotes the minimum phase difference concerning groups of requests for all movies; and, the search for a group containing two consecutive requests with the largest phase difference involves all groups of requests for all the movies. The operations performed when the earliest request in a group references a page for the first time, and when the earliest request of a group accesses the page before the last page of the corresponding movie are the same as described above for SDP events (1) and (5), respectively.

For the coarse-grained striping model where a single movie is striped over q disks, the first page of the movie is stored in the buffer 26 and the remaining pages are striped over the disks such that each stripe contains either $$\left\lceil \frac{\left\lceil \frac{l_i}{T} \right\rceil - 1}{q} \right\rceil$$

or $$\left\lceil \frac{\left\lceil \frac{l_i}{T} \right\rceil - 1}{q} \right\rceil$$

pages. The PDP techniques described above may be extended for this model as follows. As only the first page of a movie is stored in the buffer 26, when a request references the last page of a stripe, the first page of the next stripe must be retrieved from disk if this page is not already in the buffer 26. Therefore, the number of disk accesses per disk must be at most m. Further, the number of active groups consuming the first stripe and the buffer requirement of all the requests for the movie determines whether a new request may be admitted. The buffer and disk bandwidth requirement for a new request is computed as if the size of the movie is equal to the size of the first stripe plus the first page, or $$\left( \left[ \frac{\left\lceil \frac{l_i}{T} \right\rceil - 1}{q} \right] + 1 \right) \cdot d$$

bits. Thus, the number of active groups consuming the first stripe is maintained less than m. When an active group becomes passive on the first stripe, the number of active groups for the first stripe is decremented by one. When an active group becomes passive on any of the stripes except the last one, however, the group maintains the same buffer requirement. The buffer requirement of a group is reduced only when its earliest request accesses the page before the last page of the last stripe. The buffer requirement of a group does not change while the group migrates from one stripe to the next, in other words, when the data retrieval from a stripe for the earliest request finishes and the data retrieval from the next stripe starts. If the number of active groups never exceeds m on the first stripe, then the number of active groups on any of the other stripes will not exceed m.

Similarly, the PDP techniques for optimally utilizing available disk bandwidth described above may be modified for the coarse grained striping model by selecting the period equal to $$T > \frac{l_i}{2m \cdot q}$$

for the variable page size alternative, and by selecting k as the smallest integer satisfying $$k \cdot T \geq \frac{l_i}{2m \cdot q}$$

for the variable pinning duration alternative. Further, for SDP, the buffer requirement for incoming requests is computed based on the number of active groups consuming the first stripe and the phase differences of requests consuming the first stripe. Thus, the number of active groups consuming the first stripe is maintained below m under steady state when a new request arrives because only the groups consuming the first stripe for the join, combine or transition from active to passive operation are considered. Thus, the operations for SDP events (2), (3) and (4) are performed based on the requests consuming only the first stripe such that determinations concerning the number of active groups of requests for a movie involve those active groups accessing the first stripe of a movie and the term $\min_j (R_j{}^i, R_{j+1}{}^i)$ denotes the minimum phase difference concerning groups of requests accessing the first stripe of a movie. Further, group partitioning is not performed. When an active group becomes passive on the first stripe, the number of active groups for the first stripe is decremented by one; however, when an active group becomes passive on any other of the stripes except the last one, the group buffer requirement is maintained constant. The buffer requirement of a group, therefore, is reduced only when its earliest request accesses the page before the last page of the last stripe.

In the case where v movies are striped over a number of disks using coarse-grained striping, the extensions described above for PDP for single movie striping may be applied. The buffer space requirement for servicing a new request for a movie $V_i$, however, is calculated based on its phase difference to the previous request for the movie $V_i$ consuming the first stripe. The available disk bandwidth for the first stripe is determined based on the number of active groups of requests to first stripes of all movies. Furthermore, the variable pinning duration alternative may be extended by selecting the period T to satisfy $$T \geq \frac{\sum_{i=1}^{v} l_i}{2m \cdot q}$$

Furthermore, if $l_i \bmod T > 0$ is true, the last page of each movie is stored in the buffer space. To extend the variable page size alternative, k may be selected as the smallest integer satisfying $$k \geq \frac{\sum_{i=1}^{v} \left\lceil \frac{l_i}{T} \right\rceil}{2m \cdot q}$$

For SDP, the extensions described above for single movie striping may also be applied for multiple movie striping. Further, in the steady state, SDP maintains at most m-v active groups of requests consuming the first stripe. Upon arrival of a request, the modifications described in the previous section for fine-striping must be done to service the requests that are consuming the first stripe of each movie.

It is to be understood that the embodiments and variations shown and described above are merely illustrative of the principles of this invention, and that various modifications may be implemented by those skilled in the art without departing from the scope and spirit of the invention.

We claim:

1. A method of retrieving portions of a continuous media data file from a disk to a buffer on demand, said continuous media data file comprising pages of data and being characterized by a transfer rate, the method comprising the steps of:
   receiving a request for the continuous media data file;
   pinning in the buffer a page currently referenced by the request; and,
   pinning in the buffer simultaneously the next page following the page currently referenced by the request, such that data are made available in the buffer for transfer at the transfer rate.

2. The method of claim 1, wherein the initial page of the continuous media data file is permanently stored in the buffer.

3. The method of claim 1, wherein the disk comprises a plurality of continuous media data files characterized by a plurality of transfer rates, respectively.

4. The method of claim 3, wherein the initial page of the continuous media data file is permanently stored in the buffer.

5. A method of retrieving data from a server, said server comprising a disk connected to a buffer by a transmission line, wherein the disk contains a continuous media data file, said continuous media data file comprising pages of data and being characterized by a transfer rate, the method comprising the steps of:
   receiving a request for the continuous media data file;
   determining whether the next page of the continuous media data file that the request will reference is pinned in the buffer;
   paging the next page from the disk to the buffer if the next page is not pinned in the buffer; and,
   pinning the next page in the buffer simultaneously with the page currently referenced such that the next page is available for transfer when the request references the next page.

6. The method of claim 4, wherein the disk comprises a plurality of continuous media data files characterized by a plurality of transfer rates, respectively.

7. The method of claim 4, wherein the server includes a plurality of disks and the continuous media data file is stored over the plurality of disks.

8. The method of claim 7, wherein a page of the continuous media data file is striped over the plurality of disks.

9. The method of claim 7, wherein a plurality of continuous media data files are stored on the plurality of disks.

10. A method for servicing multiple requests for a continuous media data file at a server, wherein the server comprises a disk and buffer connected by a transmission line, said continuous media data file comprising pages of data and being characterized by a transfer rate, the method comprising the steps of:

receiving the requests for the continuous media data file;

pinning in the buffer pages currently referenced by the requests, respectively;

pinning in the buffer simultaneously the next pages following the currently referenced pages of the requests, respectively, such that data are made available in the buffer for transfer at the transfer rate and such that the pages of data in the buffer can be utilized for servicing more than one of the requests simultaneously;

determining whether a new request $R_i$ arrived at the server after a previously received request $R_{i-1}$ at less than or equal to a first time interval, said first time interval being equal to twice the time required for a request to consume a page of the continuous media data file from the buffer, said request $R_{i-1}$ being included in a previous group, said previous group including requests, each of which arrived at the server at less than or equal to the first time interval after a preceding request included in the previous group;

constructing a new group with the new request $R_i$ if $R_i$ did not arrive after the request $R_{i-1}$ at a time less than or equal to the first time interval, the buffer contains sufficient space for the creation of the new group including the new request $R_i$ and sufficient bandwidth is available on the transmission line for transferring pages of data to the buffer for servicing the new request $R_i$ in the newly constructed group; and, joining $R_i$ to the previous group if the new request $R_i$ arrived after the request $R_{i-1}$ at a time less than or equal to the first time interval and the buffer contains sufficient space for servicing the new request $R_i$ as part of the previous group.

11. The method of claim 10, further comprising the step of:

waiting until sufficient space in the buffer and disk bandwidth on the transmission line becomes available for constructing the new group with the new request $R_i$ if $R_i$ did not arrive after the request $R_{i-1}$ at a time less than or equal to the first time interval.

12. The method of claim 11, wherein at least one disk bandwidth unit on the transmission line must become available for servicing the new request in the newly constructed group.

13. The method of claim 10, wherein the number of pages of data for the continuous media data file is equal to at most twice the number of disk bandwidth units of the transmission line, such that any number of requests for the continuous media data file may be serviced provided that sufficient space exists in the buffer.

14. The method of claim 10, wherein the size of the pages of data for the continuous media data file is a fixed quantity, the method further comprising the step of:

selecting a duration for pinning pages in the buffer such that sufficient disk bandwidth units on the transmission line are always available for concurrently servicing any number of requests for the continuous media data file provided that sufficient space in the buffer exists.

15. The method of claim 10, wherein the server includes a plurality of disks and the continuous media data file is stored over the plurality of disks.

16. The method of claim 15, wherein a page of the continuous media data file is striped over the plurality of disks.

17. The method of claim 10, wherein a plurality of continuous media data files are stored on the plurality of disks.

18. A method of retrieving data from a server, said server comprising a disk connected to a buffer by a transmission line, wherein the disk contains a continuous media data file, said continuous media data file comprising pages of data and being characterized by a transfer rate, the method comprising the steps of:

receiving requests for the continuous media data file;

pinning in the buffer pages currently referenced by the requests, respectively;

pinning in the buffer simultaneously the next pages following the currently referenced pages of the requests, respectively, such that data are made available in the buffer for transfer at the transfer rate and such that the pages of data in the buffer can be utilized for servicing more than one of the requests simultaneously;

placing the requests in groups for servicing according to time of arrival of the requests at the server;

selecting a pinning duration for pages pinned by the earliest request in an active group such that the earliest request in an active group pins the pages in the buffer for all other requests in the active group; and, continuously re-allocating the use of space in the buffer and units of disk bandwidth on the transmission line for servicing the requests such that the number of disk accesses for a page of the continuous media data file is maintained in steady state at most equal to one less than the total number of disk bandwidth units on the transmission line.

19. The method of claim 18, further comprising the step of:

adjusting the number of requests in groups according to the total number of requests being serviced, such that the steady state disk bandwidth condition is maintained and such that the total number of requests concurrently being serviced can exceed the total number of disk bandwidth units for the transmission line.

20. The method of claim 19, wherein the adjusting step further comprises the step of:

increasing the number of requests in an existing group.

21. The method of claim 19, wherein the adjusting step further comprises the step of:

decreasing the number of requests in an existing group.

22. The method of claim 19, wherein the adjusting step further comprises the step of joining a newly received request to a latest existing group, said joining step further comprising the steps of:

incrementing pinning durations for pages currently pinned in the buffer for the latest group; and, pinning in the buffer pages referenced by the newly received request until the join operation is completed.

23. The method of claim 19, wherein the adjusting step further comprises the step of combining a first group to a second group to form a new group, wherein the second group follows the first group consecutively in time and the earliest request in the second group arrived after the latest request in the first group at a time interval greater than a first time interval, said first time interval being equal to twice the time required for a request to consume a page of the continuous media data file from the buffer, said combining step further comprising the steps of:

incrementing pinning durations for pages currently pinned in the buffer for servicing the first group; and, pinning in the buffer pages referenced by the earliest request in the second group based on the difference in arrival times at the server between the earliest request and the latest request of the second group.

24. The method of claim 23, further comprising the step of:

pinning in the buffer pages referenced by the earliest request of the first group based on the difference in arrival times between the earliest request of the first group and the latest request of the second group, if the first group is an active group.

25. The method of claim 19, wherein the adjusting step further comprises the step of partitioning a group to form a partitioned group, wherein the group initially includes a first request which arrived at the server before a second request at a time interval greater than a first time interval, said first time interval being equal to twice the time required for a request to consume a page of the continuous media data file from the buffer, said partitioning step further comprising the step of:

selecting requests from the group for inclusion in the partitioned group such that the first request is in the partitioned group and the second request remains in the group and such that less space in the buffer is required for servicing the requests included in the group before partitioning occurred.

26. The method of claim 19, further comprising the step of:

receiving a newly arrived request for the continuous media data file;

joining the newly arrived request to a latest existing group if space in the buffer is sufficient.

27. The method of claim 26, wherein the joining step further comprises the steps of:

incrementing pinning durations for pages currently pinned in the buffer for a latest group; and, pinning in the buffer pages referenced by the newly received request until the join operation is completed.

28. The method of claim 19, further comprising the step of:

receiving a newly arrived request for the continuous media data file; and, reducing the number of active groups to ensure that at least one disk bandwidth unit is available in the steady state.

29. The method of claim 28, wherein the step of reducing the number of active groups further comprises the step of joining the newly arrived request to a latest existing group.

30. The method of claim 28, wherein the step of reducing the number of active groups further comprises the step of combining two consecutive groups.

31. The method of claim 28, further comprising the step of:

pinning in the buffer the initial pages referenced by the newly admitted request until a join or combine operation which is in progress completes or until an earliest existing group becomes passive.

32. The method of claim 19, further comprising the steps of:

receiving a newly arrived request for the continuous media data file; and, computing the space available in the buffer for servicing the new request after a join or combine operation is performed.

33. The method of claim 19, further comprising the step of:

computing the space available in the buffer for servicing the new request after the earliest request of an active group accesses the page before the last page of the continuous media data file for the first time.

34. The method of claim 19, wherein the server includes a plurality of disks and the continuous media data file is stored over the plurality of disks.

35. The method of claim 19, wherein a plurality of continuous media data files are stored on the plurality of disks.

36. A system for providing continuous media services comprising:

a disk containing a continuous media data file, said continuous media data file comprising pages of data and being characterized by a transfer rate;

a buffer connected by a transmission line to said disk for storing pages of data;

a processor connected to the disk and the buffer, wherein said processor performs the operations of receiving a request for the continuous media data file; and, retrieving portions of the continuous media data file for on demand servicing of the request, wherein a page currently referenced by the request and the next page following the currently referenced page are simultaneously pinned in the buffer to provide that data are made available in the buffer for transfer at the transfer rate.

37. The system of claim 36, wherein the initial page of the continuous media data file is permanently stored in the buffer.

38. The system of claim 36, wherein the disk comprises a plurality of continuous media data files characterized by a plurality of transfer rates, respectively.

39. The system of claim 36, further comprising:

a plurality of disks, said continuous media data file being stored over the plurality of disks.

40. The system of claim 39, wherein a page of the continuous media data file is striped over the plurality of disks.

41. The system of claim 39, wherein a plurality of continuous media data files are stored on the plurality of disks.

42. A system for providing continuous media services comprising:

a disk containing a continuous media data file, said continuous media data file comprising pages of data and being characterized by a transfer rate;

a buffer connected by a transmission line to said disk for storing pages of data;

a processor connected to the disk and the buffer, wherein the processor performs the operations of:

receiving a request for the continuous media data file;

pinning in the buffer a page currently referenced and the next page following the currently referenced page of the request such that data are made available in the buffer for transfer at the transfer rate and such that the pages of data in the buffer can be utilized for servicing more than one of the requests simultaneously;

determining whether a new request $R_i$ arrived at the server after a previously received request $R_{i-1}$ at less than or equal to a first time interval, said first time interval being equal to twice the time required for a request to consume a page of the continuous media data file from the buffer, said request $R_{i-1}$ being included in a previous group, said previous group including requests, each of which arrived at the server at less than or equal to the first time interval after a preceding request in the previous group arrived at the server;

constructing a new group with the new request $R_i$ if $R_i$ did not arrive after the request $R_{i-1}$ at a time less than or equal to the first time interval, the buffer contains sufficient space for the creation of the new group including the new request $R_i$ and sufficient bandwidth is available on the transmission line for transferring pages of data to the buffer for servicing the new request $R_i$ in the newly constructed group; and, joining $R_i$ to the previous group if the new request $R_i$ arrived after the request $R_{i-1}$ at a time less than or equal to the first time interval and the buffer contains sufficient space for servicing the new request $R_i$ as part of the previous group.

43. The system of claim 42, wherein the processor further performs the operation of:

waiting until sufficient space in the buffer and disk bandwidth on the transmission line becomes available for constructing the new group with the new request $R_i$ if $R_i$ did not arrive after the request $R_{i-1}$ at a time less than or equal to the first time interval.

44. The system of claim 42, wherein the number of pages of data for the continuous media data file is equal to at most twice the number of disk bandwidth units of the transmission line, such that any number of requests for the continuous media data file may be serviced provided that sufficient space exists in the buffer.

45. The system of claim 42, wherein the size of the pages of data for the continuous media data file stored on the disk is a fixed quantity, and wherein the processor further performs the operation of:

selecting a duration for pinning pages in the buffer such that sufficient disk bandwidth units on the transmission line are always available for concurrently servicing any number of requests for the continuous media data file provided that sufficient space in the buffer exists.

46. A system for providing continuous media service comprising:

a disk containing a continuous media data file, said continuous media data file comprising pages of data and being characterized by a transfer rate;

a buffer connected by a transmission line to said disk for storing pages of data;

a processor connected to the disk and the buffer, wherein the processor performs the operations of:

receiving requests for the continuous media data file;

retrieving portions of the continuous media data file for on demand servicing of the request, wherein a page currently referenced by the request and the next page following the currently referenced page are simultaneously pinned in the buffer to provide that data are made available in the buffer for transfer at the transfer rate;

placing the requests in groups for servicing according to time of arrival of the requests at the server;

selecting a pinning duration for pages pinned by the earliest request in an active group such that the earliest request in an active group pins the pages in the buffer for all other requests in the active group; and, continuously re-allocating the use of space in the buffer and units of disk bandwidth on the transmission line for servicing the requests such that the number of disk accesses for a page of the continuous media data file is maintained in steady state at most equal to one less than the total number of disk bandwidth units on the transmission line.

47. The system of claim 46, wherein the processor further performs the operations of:

adjusting the number of requests in groups according to the total number of requests being serviced, such that the steady state disk bandwidth condition is maintained and such that the total number of requests concurrently being serviced can exceed the total number of disk bandwidth units for the transmission line.

48. The system of claim 46, wherein the processor performs the operation of increasing the number of requests in an existing group.

49. The system of claim 46, wherein the processor performs the operation of decreasing the number of requests in an existing group.

* * * * *